United States Patent
Zhang (10) Patent No.: US 12,019,909 B2
(45) Date of Patent: Jun. 25, 2024

(54) IO REQUEST PIPELINE PROCESSING DEVICE, METHOD AND SYSTEM, AND STORAGE MEDIUM

(71) Applicant: INSPUR SUZHOU INTELLIGENT TECHNOLOGY CO., LTD., Jiangsu (CN)

(72) Inventor: Bo Zhang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,138

(22) PCT Filed: Sep. 28, 2021

(86) PCT No.: PCT/CN2021/121206
§ 371 (c)(1),
(2) Date: Jun. 28, 2023

(87) PCT Pub. No.: WO2022/151766
PCT Pub. Date: Jul. 21, 2022

(65) Prior Publication Data
US 2023/0393782 A1 Dec. 7, 2023

(30) Foreign Application Priority Data

Jan. 15, 2021 (CN) .......................... 202110057735.8

(51) Int. Cl.
*G06F 3/06* (2006.01)
(52) U.S. Cl.
CPC .......... *G06F 3/0656* (2013.01); *G06F 3/0613* (2013.01); *G06F 3/0658* (2013.01); *G06F 3/0679* (2013.01)

(58) Field of Classification Search
CPC .... G06F 3/0679; G06F 3/0613; G06F 3/0656; G06F 3/0658
(Continued)

(56) References Cited

U.S. PATENT DOCUMENTS 6,804,815 B1* 10/2004 Kerr .................... H04L 49/9094
718/107
11,175,855 B2* 11/2021 Kim ...................... G06F 3/0607
(Continued)

FOREIGN PATENT DOCUMENTS

| CN | 107291392 A | 10/2017 |
| CN | 109766056 A | 5/2019 |

(Continued)

OTHER PUBLICATIONS

International Search Report for PCT/CN2021/121206 dated Jan. 6, 2022 (6 pages including English Translation).
(Continued)

*Primary Examiner* — Christopher B Shin
(74) *Attorney, Agent, or Firm* — Merchant & Gould P.C.

(57) ABSTRACT

Disclosed is an IO request pipeline processing device. The device mainly includes: an IO state buffer and a pipeline controller, wherein the IO state buffer includes multiple elements, for storing context information including a module calling sequence generated by a CPU; and the pipeline controller is configured to perform pipeline control on an IO request according to the context information. The device performs pipeline management on an IO processing state by arranging hardware modules, which shares the huge workload during an original CPU software control process, and also reduces the requirements for CPU design. At the same time, processing logic of the pipeline controller is triggered by the module calling sequence recorded in the IO state
(Continued)

buffer, which may reduce the implementation power consumption and improve the implementation efficiency.

15 Claims, 3 Drawing Sheets

(58) Field of Classification Search
USPC .............................................................. 710/5
See application file for complete search history.

(56) References Cited

U.S. PATENT DOCUMENTS

| | | | |
|---|---|---|---|
| 11,500,587 B2* | 11/2022 | Yang | G06F 3/0679 |
| 2017/0242733 A1* | 8/2017 | Qi | G06F 9/44 |
| 2018/0024778 A1* | 1/2018 | Singh | G06F 3/0659 |
| | | | 711/103 |
| 2019/0354317 A1 | 11/2019 | Fenghai | |
| 2023/0305754 A1* | 9/2023 | Kanno | G06F 3/0629 |
| | | | 711/141 |

FOREIGN PATENT DOCUMENTS

| | | |
|---|---|---|
| CN | 110618794 A | 12/2019 |
| CN | 111796771 A | 10/2020 |
| CN | 112748883 A | 5/2021 |
| IN | 108733585 A | 11/2018 |

OTHER PUBLICATIONS

Written Opinion for PCT/CN2021/121206 dated Jan. 6, 2022 (9 pages including English Translation).
Chinese Search Report for Application No. 2021100577358 dated Sep. 19, 2022 (2 pages).

* cited by examiner

IO REQUEST PIPELINE PROCESSING DEVICE, METHOD AND SYSTEM, AND STORAGE MEDIUM

CROSS-REFERENCE TO RELATED APPLICATION

This application is a National Stage Application of International Application No. PCT/CN2021/121206, filed 28 Sep. 2021, which claims benefit of Serial No. 202110057735.8, filed 15 Jan. 2021 in China, and which applications are incorporated herein by reference. To the extent appropriate, a claim of priority is made to each of the above disclosed applications.

TECHNICAL FIELD

The present disclosure relates to the technical field of request processing, in particular to an Input/Output (IO) request pipeline processing device, method and system, and a readable storage medium.

BACKGROUND

A Solid State Disk (SSD) is a device configured to store user data. The SSD consists of modules such as a controller and a storage medium NAND (flash memory). The SSD communicates with a host, and the host sends a storage request to the SSD and informs the SSD about data to be stored. After obtaining the request, the SSD stores the data into the NAND (flash memory) medium.

One reason why the SSD has extremely high performance is that high concurrency is provided, that is, the host may send multiple requests to the SSD, and the SSD may process the next request at the same time before one request has been processed. The concurrency is usually achieved by software configured to implement resource control and storage scheduling in a controller. The software records a processing state of each request (hereinafter referred to as IO request), including arrival and acquisition of the request, the processing of the request (the processing may be divided into multiple steps, and the software needs to record the state of each IO request), multiple interactions with the host during request processing, the completion of the IO request, and the like.

The overall flow control, state polling and operation processing in this implementation mode are all controlled by a Central Processing unit (CPU) in the SSD controller, which has high power consumption and high implementation cost.

In summary, how to reduce the control load of the CPU for IO request processing, reduce the implementation power consumption, and improve the processing performance is an urgent technical problem to be solved by those skilled in the art.

SUMMARY

The present disclosure aims to provide an IO request pipeline processing device, an IO request pipeline processing method and system, and a readable storage medium, so as to reduce the control load of a CPU for IO request processing, reduce the implementation power consumption, and improve the processing performance.

It is to be noted that an "element" mentioned in the IO request pipeline processing device, method and system, and the readable storage medium provided by the present disclosure is a storage unit defined in the present disclosure for storing context information of an IO request in an IO state buffer, and the name is not limited thereto. The present disclosure only takes the "element" as an example for introduction. The storage units defined by other names in the IO state buffer for storing the context information of the IO request in the IO state buffer are all within the scope of protection of the present disclosure. In order to solve the above technical problem, the present disclosure provides the following technical solutions.

The application provides an IO request pipeline processing device, which includes an IO state buffer and a pipeline controller.

The IO state buffer includes multiple elements, which are used for storing context information of an IO request. The context information includes a module calling sequence generated by a CPU in an SSD controller.

The pipeline controller is configured to perform pipeline control on the IO request according to the context information.

In an embodiment, the pipeline controller includes a first processor and a second processor.

The first processor is configured to read, after receiving an element addition notification sent by the CPU, the module calling sequence in the newly added element, determine a first functional module to be called according to the module calling sequence, and send the IO request corresponding to the newly added element to the first functional module to be called for operation processing.

The second processor is configured to receive an operation completion notification sent by the functional module in a system, read the next functional module to be processed corresponding to the operation completed IO request from the IO state buffer, and send the operation completed IO request to the next functional module to be processed; and determine a current IO request to be processed of the operation completed functional module according to a scheduling algorithm, and send the current IO request to be processed to the operation completed functional module for operation processing.

In an embodiment, the pipeline controller further includes a third processor, configured to send an IO request completion notification to the CPU if the next functional module to be processed corresponding to the operation completed IO request is not read from the IO state buffer.

In an embodiment, the elements are equal-length elements arranged according to a preset space occupation size.

The present disclosure provides an IO request pipeline processing method. The method includes the following operations.

A pipeline controller reads context information of an element corresponding to an IO request in an IO state buffer, and determines a module calling sequence corresponding to the IO request. Herein, the context information includes the module calling sequence generated by a CPU in an SSD controller.

According to the module calling sequence, the IO request is sent to a corresponding functional module for request processing.

In an embodiment, the operation that the pipeline controller reads the context information of the element corresponding to the IO request in the IO state buffer, and determines the module calling sequence corresponding to the IO request includes the following operations.

After receiving an element addition notification sent by the CPU, the pipeline controller determines an element position corresponding to the newly added IO request in the IO state buffer.

The context information corresponding to the element position is read, and the first functional module to be called is determined.

After receiving an operation completion notification sent by the functional module in a system, the module calling sequence corresponding to the operation completed IO request is read from the IO state buffer.

According to the module calling sequence, the next functional module to be processed is determined.

In an embodiment, the IO request pipeline processing method further includes the following operation.

If the next functional module to be processed corresponding to the operation completed IO request is not read from the IO state buffer, an IO request completion notification is sent to the CPU.

The present disclosure provides an IO request pipeline processing system, which includes the above IO request pipeline processing system and an SSD controller. The IO request pipeline processing device includes an IO state buffer and a pipeline controller.

The SSD controller is configured to allocate, after receiving an IO request initiated by a host, an element for storing context information to the IO request in the IO state buffer; and determine a module calling sequence of the IO request, and write the module calling sequence to the element.

The IO state buffer includes multiple elements, which are used for storing context information of the IO request. The context information includes the module calling sequence generated by a CPU in the SSD controller.

The pipeline controller is configured to perform pipeline control on the IO request according to the context information.

In an embodiment, the pipeline controller is also configured to send an IO request completion notification to the CPU if a next functional module to be processed corresponding to the operation completed IO request is not read from the IO state buffer.

Accordingly, the CPU is also configured to delete the element corresponding to the IO request from the IO state buffer after receiving the IO request completion notification.

The present disclosure provides a readable storage medium, on which a computer program is stored, and when executed by a processor, the computer program implements the steps of the IO request pipeline processing device as described above.

The present disclosure provides the IO request pipeline processing device, which mainly includes the IO state buffer and the pipeline controller. The IO state buffer includes multiple elements, which are used for storing the context information of the IO request. The context information includes the module calling sequence generated by the CPU. The pipeline controller is configured to perform pipeline control on the IO request according to the context information. The device performs pipeline management on an IO processing state by arranging hardware modules, which reduces the huge workload during an original CPU software control process, reduces the load of the CPU, and also reduces the requirements for CPU design. At the same time, processing logic of the pipeline controller is triggered by the module calling sequence recorded in the IO state buffer, which may reduce the implementation power consumption and improve the implementation efficiency.

Accordingly, embodiments of the present disclosure also provide a method, system and readable storage medium corresponding to the above IO request pipeline processing device, which have the above beneficial effects and will not be elaborated here.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

The core of the present disclosure is to provide an IO request pipeline processing device, which may reduce the control load of a CPU for IO request processing, reduce the implementation power consumption, and improve the processing performance.

In order to make the solutions of the present disclosure understood by those skilled in the art, the present disclosure will be described below in detail in combination with the drawings and the specific implementation modes. It is apparent that the described embodiments are only a part of the embodiments of the present disclosure, and not all of them. All other embodiments obtained by those of ordinary skill in the art based on the embodiments of the present disclosure without creative efforts are within the scope of protection of the present disclosure.

A controller contains multiple hardware functional modules, such as a protocol module interacting with a host, a Direct Memory Access (DMA) module for data transmission, an operation module related to data encryption and decryption, and a resource management module. An IO request may involve in a dozen processing steps, and each step needs to call the corresponding functional module for processing. Each functional module may only respond to one IO request at a time (in order to improve the performance, the key module may have multiple instances, each instance may respond to one IO request at the same time, but each instance may only respond to one IO request). When the request is processed, the request releases the functional module and another IO request may use this module. Therefore, a very important job of the software in the controller is to check whether all the IO requests are operated from one functional module, and if so, the IO request is pushed to the next functional module.

The IO request is completed in multiple steps, namely multi-stage pipelines. The number of pipeline stages of each IO request is not necessarily the same. It is possible that some IO requests only need n stages of processing, and some need m stages. These IO requests may also be executed out of order, and may be released as soon as one IO request reaches a completed state. After any functional module is released, the request may be selected to fill this stage of the pipeline. At present, the above process polls a processing state of each functional module and the processing progress of each IO request on the basis of a CPU, which has a large resource overhead.

The pipeline of an SSD is different from that of the CPU. Firstly, the time of each stage of pipelining of the SSD is different, while the time of the pipeline of the CPU is equal or approximately equal, so that no additional data structure is needed to store each instruction (namely information of each IO request as mentioned above). Secondly, each IO instruction in the pipeline of the SSD may recycle the functional module in the controller. In the CPU, a path of the pipeline is predetermined, while in a control flow of the SSD, a module use sequence in the controller may not be predetermined. The concurrency of the SSD is extremely high, and there may be thousands or even tens of thousands of instructions in execution. Common CPU pipelines do not have such high concurrency requirements.

Generally, an SSD controller manages the states of all the IOs by the software in the CPU to complete the above operations. When the software monitors the completion of a certain Stage (operation step) of a certain IO, it may find the next Stage corresponding to this IO and send same to the functional module corresponding to the next Stage.

In the present disclosure, a hardware IO request pipeline processing device is designed. For the SSD controller, all IO pipeline operation states of all the IOs are managed by the device, hardware monitors whether these states are completed, and sends same to the next functional module after completion. Through the hardware implementation of the structure, the load of the CPU may be greatly reduced, so as to reduce the power consumption and system cost.

Figure 1:
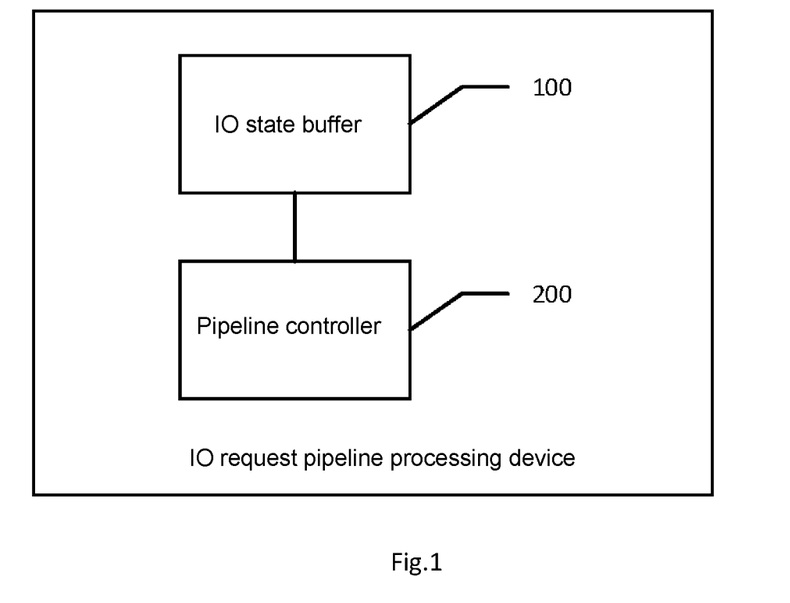
FIG. 1 is an implementation flowchart of an IO request pipeline processing device in an embodiment of the present disclosure.

Referring to FIG. 1, FIG. 1 is schematic structural diagram of an IO request pipeline processing device in an embodiment of the present disclosure, which mainly includes two parts: an IO state buffer and a pipeline controller.

Figure 2:
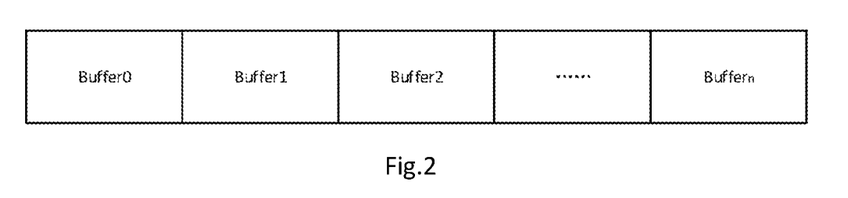
FIG. 2 is a schematic diagram of storage of an IO state buffer in an embodiment of the present disclosure.

The IO State Buffer 100 is a storage space in which multiple elements (buffers) are stored. FIG. 2 shows a schematic diagram of storage of the IO state buffer storage, each element corresponds to an IO request, and context information of the IO request is recorded. The size of the space occupied by each element is not limited in this embodiment and may be set according to the actual use needs.

The type of information mainly included in the context information is not limited, mainly including a module calling sequence generated by a CPU. The module calling sequence indicates a module scheduling sequence corresponding to the IO request, including the number of modules to be scheduled as a whole and modules to be scheduled next, such as module 1-module 4-module 2-module 6. In addition, the context information may further include attribute information of the IO request, such as the type, parameters and a current state of the IO request, so as to determine a real-time calling state.

The context information may be filled in by Firmware running on the CPU of an SSD controller. Once configured, the Firmware may trigger the pipeline controller (for example, informing the pipeline controller which Buffer element is ready to be put into the pipeline). The specific filling steps are not limited in the embodiment. In order to deepen the understanding, an implementation mode of controlling automatic filling of the context information by the SSD controller is specifically described below.

The SSD controller receives a request from a host, makes a response through the Firmware running on the CPU, and applies for allocation of an element in the IO state buffer.

According to the type of the current IO request, the firmware determines which functional module to enter first.

According to the type of the request and a processing result of the previous functional module, the firmware determines a preset module calling sequence, and writes same in the IO state buffer.

The above is an implementation mode, and other filling methods of the context information may refer to the above introduction, which will not be elaborated here.

It is to be noted that after the CPU analyzes the IO request to obtain the context information and fills same into the IO state buffer, the subsequent flow control (namely pipeline processing of the IO request) process is controlled and realized by the IO request pipeline processing device provided by the embodiment, and the conventional method of the above process is controlled and realized by the CPU through the software. The IO request pipeline processing device provided by the embodiment may share the processing pressure of the IO request of the CPU, and correspondingly improve the processing efficiency of other tasks of the CPU.

The number of elements may be thousands or tens of thousands. Multiple elements may be applied in advance, and the elements applied in advance may be directly utilized to store the context information after receiving the new IO, or the elements may also be applied after there is a new IO request, which is not limited in this embodiment and may be determined according to the design performance of the SSD.

The capacity of each element may be fixed or variable, which may be arranged according to the actual use needs. The elements may be equal-length elements arranged according to a preset space occupancy size, that is, all the elements have the same occupancy size, which is the preset space occupancy size. This arrangement method may simplify the element generation step.

After the context information is written, the pipeline controller 200 may be triggered. It is to be noted that the context information stored into the element may be adjusted according to the processing results of the subsequent functional modules. For example, the CPU may adjust the module calling sequence according to the processing result of the previous functional module and the type of the IO request, but the executed sequence may not be adjusted, only the un-executed module calling sequence may be adjusted, and the subsequent pipeline controller may directly perform pipeline control processing on the IO requests according to the un-executed calling sequence of the functional module.

All the functional modules in the system are connected to the pipeline controller 200. The functional modules include a protocol module interacting with a host, a DMA module for data transmission, an operation module related to data encryption and decryption, a resource management module, and other hardware functional modules, as well as the CPU. Since most IO requests may determine the next state on the basis of the actual operation, the first functional module that needs to be transferred is often the CPU. In addition, when dealing with more complex processes and logic, the pipeline controller needs the CPU to operate. After completing the processing of the previous request, the CPU may obtain the next request from the pipeline controller. The obtaining method may be that the pipeline controller sends the next request to the CPU through a bus, or the CPU actively polls the pipeline controller. Unless there is no new request to the CPU, the CPU may not idle, and may obtain the IO request that needs to be processed each time, so that the CPU may also be regarded as the functional module.

After the pipeline controller 200 is triggered by the CPU to have a new IO request to be processed, the pipeline controller reads the content of the element of the pipeline controller, obtains the functional module (number) to be operated next, knows the preset sequence, and then calls the first functional module.

The connection between the functional module and the pipeline controller 200 is bidirectional. When the functional module completes one IO request, it may inform the pipeline controller, so that the pipeline controller may schedule other tasks. The pipeline controller may also inform the functional module, so that it may handle the next task.

The pipeline controller 200 is mainly configured to perform pipeline control on the IO request according to the context information, and task scheduling thereof includes two parts, scheduling of the IO request (the IO request is sent to the corresponding functional module) and scheduling of the functional module (the next IO request to be processed is allocated to the functional module).

In an embodiment, the pipeline controller may include a first processing unit and a second processing unit.

The first processing unit is configured to read, after receiving an element addition notification sent by the CPU, the module calling sequence in the newly added element, determine the first functional module to be called according to the module calling sequence, and send the IO request corresponding to the newly added element to the first functional module to be called for operation processing.

The second processing unit is mainly configured to receive an operation completion notification sent by the functional module in a system, read a next functional module to be processed corresponding to the operation completed IO request from the IO state buffer, and send the operation completed IO request to the next functional module to be processed; and determine a current IO request to be processed of the operation completed functional module according to a scheduling algorithm, and send the current IO request to be processed to the operation completed functional module for operation processing.

The completion time of each functional module may be very long. Before the completion of the task allocated by the functional module, the pipeline controller may receive the notification (such as a new IO request addition notification from the CPU, a task completion notification from other functional modules, etc.). The pipeline controller determines which functional modules are idle. If the idle functional module exists and is in the next state necessary for the number of module calls corresponding to the IO request, it may be sent to the corresponding functional module. When multiple requests wait for the same functional module, the functional module determines a queuing sequence according to an embedded scheduling algorithm. This sequence may be First In First Out (FIFO), a priority queue, or a random shuffling sequence, etc., which is not limited in this embodiment. When one functional module is released (one IO request is processed), the queued IO request is selected as the first IO request to be processed according to the scheduling algorithm, and sent to the functional module for processing.

The above functional logic is configured with the notification as a trigger condition. When the element addition notification sent by the CPU is received, processing logic of the new IO request is triggered. When the operation completion notification sent by the functional module in the system is received, IO transfer processing logic is triggered. By using the notification as the trigger condition of the processing logic, the workload caused by state polling in the conventional implementation mode is avoided, and the software processing logic may be simplified, thereby improving the processing efficiency.

The pipeline controller 200 further includes a third processing unit. The third processing unit is configured to send an IO request completion notification to the CPU if the next functional module to be processed corresponding to the operation completed IO request is not read from the IO state buffer (that is, all the modules in the module calling sequence are operated, and the pipeline processing of the functional module is completed), so that the CPU may immediately trigger the subsequent processing flow, for example, the CPU may delete same in the State Buffer to reduce the space occupation of the IO state buffer and accelerate the transfer of the IO request.

In this embodiment, only the configuration of the above functional logic of the pipeline controller is introduced as an example, the implementation of other functional logic configurations under the use need and the interaction between the devices may refer to the introduction of this embodiment, and will not be elaborated here.

Based on the above introduction, the embodiments of the present disclosure provide the IO request pipeline processing device. The device performs pipeline management on an IO processing state by arranging hardware modules, which reduces the huge workload during an original CPU software control process, reduces the load of the CPU, and also reduces the requirements for CPU design. At the same time, the processing logic of the pipeline controller is triggered by the module calling sequence recorded in the IO state buffer, which may reduce the implementation power consumption and improve the implementation efficiency.

It is to be noted that the embodiments of the present disclosure also provide a corresponding improvement solution based on the above embodiment. The same steps or corresponding steps in the above embodiment as those in the preferred/improved embodiment may be referred to each other, and corresponding beneficial effects may be referred to each other, which will not be elaborated in the following preferred/improved embodiments herein.

Corresponding to the above device embodiment, the embodiments of the present disclosure also provide an IO request pipeline processing method, and the IO request pipeline processing method described below and the IO request pipeline processing device described above may be referred to each other.

Figure 3:
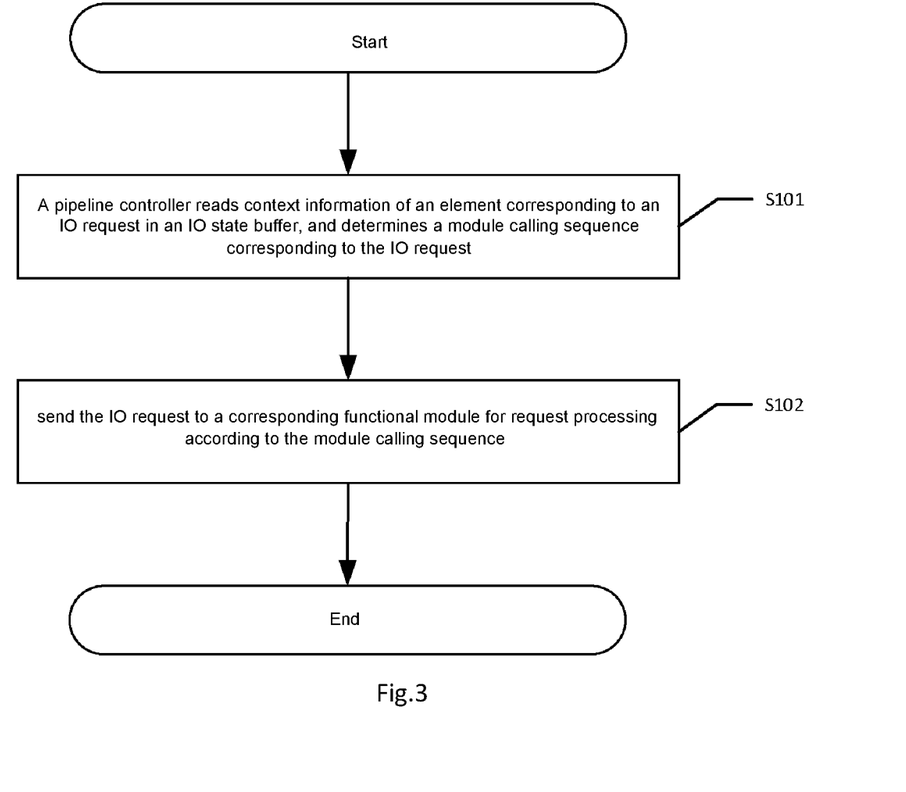
FIG. 3 is a flowchart of an IO request pipeline processing method in an embodiment of the present disclosure.

Referring to FIG. 3, the method mainly includes the following steps.

At S101, a pipeline controller reads context information of an element corresponding to an IO request in an IO state buffer, and determines a module calling sequence corresponding to the IO request.

The IO state buffer includes multiple elements. The context information of the corresponding IO request is stored into each element. The context information includes a module calling sequence generated by a CPU in an SSD controller.

When processing a certain IO request, the module calling sequence stored into the corresponding element needs to be read from the IO state buffer.

In this embodiment, no limits are made to the implementation mode of determining the element corresponding to the IO request in the IO buffer by the pipeline controller, for example, determining through an element number.

Herein, the specific implementation of the step that the pipeline controller reads the context information of the element corresponding to the IO request in the IO state buffer, and determines the module calling sequence corresponding to the IO request may include the following steps.

(1) After receiving an element addition notification sent by the CPU, the pipeline controller determines an element position corresponding to the newly added IO request in the IO state buffer.

(2) The context information corresponding to the element position is read, and the first functional module to be called is determined.

(3) After receiving an operation completion notification sent by the functional module in a system, the module calling sequence corresponding to the operation completed IO request is read from the IO state buffer.

(4) According to the module calling sequence, the next functional module to be processed is determined.

In the above implementation steps, the processing logic of pipeline control is divided into two parts. When the element addition notification sent by the CPU is received, it indicates that there is a new IO request to be processed, the first uncalled functional module is read from the module calling sequence corresponding to the element thereof, and the request is sent to the functional module to start the pipeline processing of the IO request. After receiving the operation completion notification from the functional module in the system, the next functional module to be called is read from the IO state buffer, and the IO request that has just completed a stage of operation is sent to the module to start the next stage of request processing, so as to realize the pipeline transfer of the IO request.

At S102, according to the module calling sequence, the IO request is sent to the corresponding functional module for request processing.

The module calling sequence indicates the functional module corresponding to each stage of request processing, and sends the IO requests to the corresponding functional module one by one for request processing according to the module calling sequence, so as to realize the pipeline control of the IO requests.

Further, the pipeline controller may further execute the following step that: an IO request completion notification is sent to the CPU if the next functional module to be processed corresponding to the operation completed IO request is not read from the IO state buffer, so as to end the processing of one IO request.

The IO request pipeline processing method provided by the embodiment is implemented by the request pipeline processing device provided by the above embodiment. In the method, two hardware modules, the IO state buffer and the pipeline controller, are called to perform pipeline management on an IO processing state, which reduces the huge workload during an original CPU software control process, reduces the load of the CPU, and also reduces the requirements for CPU design. At the same time, the processing logic of the pipeline controller is triggered by the module calling sequence recorded in the IO state buffer, which may reduce the implementation power consumption and improve the implementation efficiency.

Corresponding to the above method embodiment, the embodiments of the present disclosure also provide an IO request pipeline processing system, and the IO request pipeline processing system described below and the IO request pipeline processing method and device described above may be referred to each other.

Figure 4:
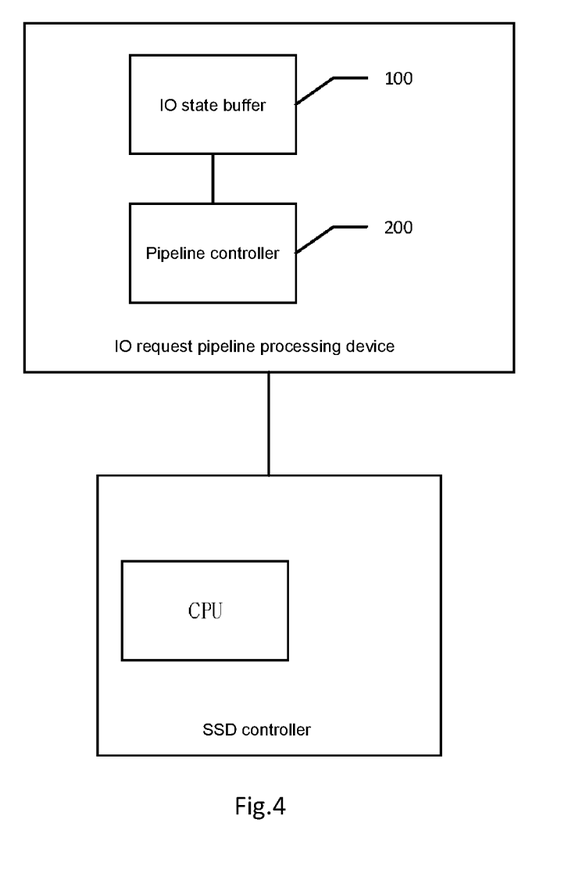
FIG. 4 is a schematic structural diagram of an IO request pipeline processing system in an embodiment of the present disclosure.

Referring to FIG. 4, the system mainly includes an IO request pipeline processing device and an SSD controller. The IO request pipeline processing device mainly includes an IO state buffer and a pipeline controller.

The IO state buffer includes multiple elements, which are used for storing context information of an IO request. The context information includes a module calling sequence generated by a CPU in the SSD controller.

The pipeline controller is configured to perform pipeline control on the IO request according to the context information.

The relevant introduction of the IO request pipeline processing device may refer to the introduction of the above embodiment, which will not be elaborated here.

The SSD controller is mainly configured to allocate, after receiving the IO request initiated by a host, the element for storing context information to the IO request in the IO state buffer; and determine the module calling sequence of the IO request, and write the module calling sequence to the element.

For example, the SSD controller receives a request from the host, makes a response through Firmware running on the CPU, and allocates one element to the IO State Buffer.

The allocated Buffer element contains information marking this IO, including the type of the IO, parameters of the IO, and a current state of the IO.

According to the type of the request, the firmware determines which functional module to enter. Since most IO requests determine the next state based on the actual operation, the next functional module is often the CPU (the CPU may also be regarded as the functional module, or as a certain stage of the pipeline).

According to the type of the request, the firmware determines a preset module calling sequence, and writes same in the IO state buffer.

Once configured, the Firmware may trigger the pipeline controller, and informs the pipeline controller which Buffer element is ready to be put into the pipeline, so as to facilitate transfer processing of the pipeline controller.

In this embodiment, only the above implementation mode is introduced as an example, and other implementation modes may refer to the introduction of this embodiment, and will not be elaborated here.

Corresponding to the above method embodiment, the embodiments of the present disclosure also provide a readable storage medium. The readable storage medium described below and the IO request pipeline processing method may be referred to each other.

A readable storage medium is provided, on which a computer program is stored, and when executed by a processor, the computer program implements the steps of the IO request pipeline processing method in the above method embodiment.

The readable storage medium may be various media capable of storing program codes such as a U disk, a mobile hard disk, a Read-Only Memory (ROM), a Random Access Memory (RAM), a magnetic disk, or an optical disk.

Those skilled in the art may realize that the units and algorithm steps of each example described in combination with the embodiments disclosed in the present disclosure may be implemented by electronic hardware, computer hardware or a combination of computer software and the electronic hardware. In order to clearly illustrate the interchangeability of hardware and software, the composition and steps of each example have been described in general terms of function in the above description. Whether these functions are executed in a hardware or software manner depends on specific applications and design constraints of the technical solutions. Those skilled in the art may realize the described functions for each specific application by use of different methods, but such realization shall fall within the scope of the present disclosure.

What is claimed is:

1. An Input/Output (IO) request pipeline processing device, comprising an IO state buffer and a pipeline controller, wherein
the IO state buffer comprises multiple elements for storing context information of IO requests, and each element corresponds to an IO request; the context information comprises a module calling sequence generated by a Central Processing Unit (CPU) in a Solid State Disk (SSD) controller, wherein the module calling sequence indicates a functional module scheduling sequence corresponding to each of the IO requests; and
the pipeline controller is configured to perform pipeline control on the IO requests according to the module calling sequence of each of IO requests;
wherein the pipeline controller comprises:
a first processor, configured to read, after receiving an element addition notification sent by the CPU and due to a new IO request is received by the SSD, a module calling sequence in the newly added element, determine a first functional module to be called according to the module calling sequence, and send an IO request corresponding to the newly added element to the first functional module to be called for operation processing; and
a second processor, configured to receive an operation completion notification sent by a functional module in a system, read from an IO state buffer a next functional module to be processed corresponding to an operation completed IO request, and send the operation completed IO request to the next functional module to be processed; and determine a current IO request to be processed by an operation completed functional module according to a scheduling algorithm, and send the current IO request to be processed to the operation completed functional module for operation processing.

2. The IO request pipeline processing device according to claim 1, wherein the pipeline controller further comprises a third processor, configured to send an IO request completion notification to the CPU when a next functional module to be processed corresponding to the operation completed IO request is not read from the IO state buffer.

3. The IO request pipeline processing device according to claim 1, wherein the elements are equal-length elements arranged according to a preset space occupation size.

4. An Input/Output (IO) request pipeline processing method, comprising:
reading, by a pipeline controller, context information of an element corresponding to an IO request in an IO state buffer, and determining a module calling sequence corresponding to the IO request, wherein the context information comprises the module calling sequence generated by a Central Processing Unit (CPU) in a Solid State Disk (SSD) controller, wherein the module calling sequence indicates a module scheduling sequence corresponding to each of the IO requests; and
sending, by the pipeline controller, according to the module calling sequence, the IO request to a corresponding functional module for request processing;
wherein the reading, by a pipeline controller, context information of an element corresponding to an IO request in an IO state buffer, and determining a module calling sequence corresponding to the IO request comprises:
after receiving an element addition notification sent by the CPU and due to a new IO request is received by the SSD, determining, by the pipeline controller, an element position corresponding to the newly added IO request in the IO state buffer;
reading, by the pipeline controller, the context information corresponding to the element position, and determining a first functional module to be called;
after receiving an operation completion notification sent by the first functional module in a system, reading, by a pipeline controller, the module calling sequence corresponding to an operation completed IO request from the IO state buffer; and
determining, by a pipeline controller, a next functional module to be processed according to the module calling sequence.

5. The IO request pipeline processing method according to claim 4, further comprising:
when the next functional module to be processed corresponding to the operation completed IO request is not read from the IO state buffer, sending an IO request completion notification to the CPU.

6. An IO request pipeline processing system, comprising the IO request pipeline processing device as claimed in claim 1 and a Solid State Disk (SSD) controller, wherein the IO request pipeline processing device comprises an IO state buffer and a pipeline controller;
the SSD controller is configured to allocate, after receiving an IO request initiated by a host, an element for storing context information to the IO request in the IO state buffer; and
determine a module calling sequence of the IO request, and write the module calling sequence to the element;
the IO state buffer comprises multiple elements for storing context information of the IO request; the context information comprises the module calling sequence generated by a Central Processing Unit (CPU); and
the pipeline controller is configured to perform pipeline control on the IO request according to the module calling sequence.

7. The IO request pipeline processing system according to claim 6, wherein the pipeline controller is further configured to send an IO request completion notification to the CPU when a next functional module to be processed corresponding to the operation completed IO request is not read from the IO state buffer; and
the CPU is further configured to delete the element corresponding to the IO request from the IO state buffer after receiving the IO request completion notification.

8. A non-transitory computer-readable storage medium, wherein a computer program is stored on the computer-readable storage medium, and the computer program is configure to, when executed by a processor, cause the processor to:
read context information of an element corresponding to an IO request in an IO state buffer, and determine a module calling sequence corresponding to the IO request, wherein the context information comprises the module calling sequence generated by a Central Processing Unit (CPU) in a Solid State Disk (SSD) controller, wherein the module calling sequence indicates a module scheduling sequence corresponding to each of the IO requests; and send, according to the module calling sequence, the IO request to a corresponding functional module for request processing;

the computer program is further configure to cause the processor to:

after receive an element addition notification sent by the CPU and due to a new IO request is received by the SSD, determine an element position corresponding to the newly added IO request in the IO state buffer;

read the context information corresponding to the element position, and determine a first functional module to be called;

after receive an operation completion notification sent by the first functional module in a system, read the module calling sequence corresponding to the IO request from the IO state buffer; and determine a next functional module to be processed according to the module calling sequence.

9. The non-transitory computer-readable storage medium according to claim 8, the computer program is further configure to cause the processor to:

when a next functional module to be processed corresponding to the operation completed IO request is not read from the IO state buffer, send an IO request completion notification to the CPU.

10. The IO request pipeline processing system according to claim 6, wherein the pipeline controller further comprises a third processor, configured to send an IO request completion notification to the CPU when the next functional module to be processed corresponding to the operation completed IO request is not read from the IO state buffer.

11. The IO request pipeline processing system according to claim 6, wherein the elements are equal-length elements arranged according to a preset space occupation size.

12. The IO request pipeline processing device according to claim 1, wherein the context information further comprise attribute information of the IO request, and the attribute information comprise a type, a parameter and a current state of the IO request.

13. The IO request pipeline processing device according to claim 1, wherein the CPU is further configure to adjust the module calling sequence according to a processing result of a previous functional module and a type of the IO request.

14. The IO request pipeline processing device according to claim 1, wherein the functional module comprise at least one of the following: a protocol module interacting with a host, a DMA module for data transmission, an operation module related to data encryption and decryption, a resource management module, the CPU.

15. The IO request pipeline processing device according to claim 1, wherein the CPU is further configure to analyze the IO request to obtain the context information and fill the context information into the IO state buffer.

* * * * *